US007673335B1

(12) United States Patent
Chakravarty et al.

(10) Patent No.: US 7,673,335 B1
(45) Date of Patent: Mar. 2, 2010

(54) COMPUTER-IMPLEMENTED METHOD AND SYSTEM FOR SECURITY EVENT CORRELATION

(75) Inventors: Dipto Chakravarty, Potomac, MD (US); Ofer Zajicek, Potomac, MD (US); Frank Pellegrino, Greenbelt, MD (US); Usman Choudhary, Springfield, VA (US); John Gassner, Alexandria, VA (US); Melvin Antony, Vienna, VA (US)

(73) Assignee: Novell, Inc., Provo, UT (US)

( * ) Notice: Subject to any disclaimer, the term of this patent is extended or adjusted under 35 U.S.C. 154(b) by 1049 days.

(21) Appl. No.: 10/975,374

(22) Filed: Oct. 29, 2004

Related U.S. Application Data

(60) Provisional application No. 60/584,122, filed on Jul. 1, 2004.

(51) Int. Cl.
*G06F 12/14* (2006.01)
(52) U.S. Cl. ........................................... 726/11
(58) Field of Classification Search ................ 726/11, 726/22, 23
See application file for complete search history.

(56) References Cited

U.S. PATENT DOCUMENTS

| | | | | |
|---|---|---|---|---|
| 5,630,069 | A | 5/1997 | Flores et al. | 395/207 |
| 6,205,407 | B1 | 3/2001 | Testa et al. | 702/119 |
| 6,208,720 | B1 | 3/2001 | Curtis et al. | 379/114 |
| 6,618,766 | B1 | 9/2003 | Eshghi | 709/318 |
| 6,779,120 | B1 * | 8/2004 | Valente et al. | 726/1 |
| 6,792,456 | B1 | 9/2004 | Hellerstein et al. | 709/224 |
| 6,807,583 | B2 | 10/2004 | Hrischuk et al. | 709/318 |
| 6,839,850 | B1 * | 1/2005 | Campbell et al. | 726/23 |
| 6,886,102 | B1 * | 4/2005 | Lyle | 726/23 |
| 6,983,221 | B2 | 1/2006 | Tracy et al. | 702/181 |
| 7,065,493 | B1 | 6/2006 | Homsi | 705/8 |
| 7,324,108 | B2 | 1/2008 | Hild et al. | 345/440 |
| 2003/0172166 | A1 | 9/2003 | Judge et al. | 709/229 |
| 2004/0010709 | A1 | 1/2004 | Baudoin et al. | 713/201 |
| 2004/0015497 | A1 | 1/2004 | Swarna et al. | 707/6 |
| 2004/0138970 | A1 | 7/2004 | Ramachandran et al. | 705/34 |
| 2005/0005017 | A1 * | 1/2005 | Ptacek et al. | 709/229 |
| 2005/0086502 | A1 | 4/2005 | Rayes et al. | 713/189 |
| 2005/0160134 | A1 | 7/2005 | Childress et al. | 709/200 |
| 2005/0222811 | A1 | 10/2005 | Jakobson et al. | 702/183 |
| 2006/0130070 | A1 | 6/2006 | Graf | 719/318 |
| 2007/0047439 | A1 | 3/2007 | An et al. | 370/231 |
| 2007/0180490 | A1 | 8/2007 | Renzi et al. | 726/1 |
| 2007/0192853 | A1 | 8/2007 | Shraim et al. | 726/22 |
| 2007/0192862 | A1 | 8/2007 | Vermeulen et al. | 726/23 |
| 2008/0016502 | A1 | 1/2008 | Henderson et al. | 717/143 |
| 2008/0047009 | A1 | 2/2008 | Overcash et al. | 726/23 |

* cited by examiner

*Primary Examiner*—Ellen Tran
(74) *Attorney, Agent, or Firm*—Pillsbury Winthrop Shaw Pittman LLP

(57) ABSTRACT

A system and method for analyzing events from devices relating to network security, includes a device interface(s), for receiving events from devices. One or more processors, responsive to the event received pursuant to the device interfaces, evaluate the event in accordance with rules, wherein the rules define, inter alia, an operation the system is to take to evaluate the event and an action to be taken under specified conditions. Also, the processor can determine, responsive to the received event, whether the event is of interest, and if not, discarding the event. The processor can provide a correlation corresponding to the at least one event, for the rules.

24 Claims, 9 Drawing Sheets

COMPUTER-IMPLEMENTED METHOD AND SYSTEM FOR SECURITY EVENT CORRELATION

RELATED APPLICATIONS

This application claims priority to U.S. Provisional Patent Application No. 60/584,122, filed Jul. 1, 2004, which is expressly incorporated herein by reference.

BACKGROUND OF THE INVENTION

1. Field of the Invention

The present invention relates in general to computer systems, and more specifically to managing security events that occur in a computing environment.

2. Description of the Related Art

In today's computing environment, threats to the security of computer systems are increasing both in frequency and in complexity. Such threats can arise not only from outside an organization, but also from within even a trusted computing environment.

Unfortunately, an organization can lose assets, time, and even customers due to threats that successfully breach its computing environment or that exploit flaws in its information infrastructure. Because business assets, personnel, and security products constantly change, accurately observing and assessing activities that may threaten the security of the computing environment presents a constant and expanding challenge.

Security addressing certain risks posed by a variety of external events and attackers can be well served by firewalls and other conventional devices. However, insider attacks, such as hacking by employees inside a corporation, are not very well detected by any firewall. Moreover, some more complex security risks, e.g., those representing a more coordinated threat, are not detected by conventional devices.

Furthermore, other types of risks, such as known viruses, can be addressed by application software. For example, various commercially available software applications can provide one or more rules, e.g., as plug-ins, for detecting received files that contain one or more specific viruses.

Consider that the security of an enterprise network conventionally begins with various devices on an organization's network, such as a firewall, a router, an intrusion detection system, a scanner, bridge, router switch, and so on. It would not be unusual for a large installation to have more than two thousand devices included in the security of the network, and each device can be configured in accordance with known techniques to send out security events. Analyzing each and every possible security event can present, at times, an overwhelming task.

The result has been a patchwork of security management efforts, typically applied unevenly throughout a computing environment, where the efforts are directed to certain types of computer security events. Moreover, this patchwork can be awkward to utilize. Additionally, security management efforts that are directed toward more subtle or complex types of security breaches tend to be after-the-fact, and hence are frequently not particularly useful for actively preventing efforts to breach security.

The relevant industry has spent what is likely to be millions of dollars looking for a solution. These have not, however, adequately addressed users' needs for computer security. Users are still searching for a solution to provide an adequate system and method for real-time security event management.

SUMMARY OF THE INVENTION

The present invention alleviates various deficiencies of conventional techniques and systems described above in the various alternate embodiments described herein. The present invention responds to the need for real time security event management. One or more embodiments provide for handling security events in a real time manner, including for example dispatching events for handling, correlating dispatched events to active rules to be applied to events, generating an event/rule correlation for correlated events and rules, and evaluating the event/rule correlations according to, e.g., a filter, a window of events, and/or a trigger manager.

Accordingly, one or more embodiments of the present invention provide a method, system, and computer program device for analyzing events from devices relating to network security. There is provided at least one device interface, for receiving at least one event from a device. Also provided is at least one processor, wherein the at least one processor is configured to facilitate, responsive to the at least one event received pursuant to the at least one device interface, evaluating the at least one event in accordance with a plurality of rules including at least one, wherein the at least one rule defines an operation the system is to take to evaluate the at least one event.

One or more embodiments provides that the processor is further configured to facilitate determining, responsive to the at least one event received pursuant to the at least one device interface, whether the at least one event is of interest, and if not, discarding the at least one event.

In accordance with one or more embodiments, the at least one event is determined to be of interest pursuant to a filter.

According to alternative embodiments, there are provided a plurality of processors, and wherein the at least one event is received by the plurality of processors, and wherein the plurality of processors are configured to distribute the plurality of rules amongst the plurality of processors.

In accordance with one or more embodiments, at least one processor is further configured to facilitate producing at least one correlation corresponding to the at least one event, for the at least one rule.

According to one or more embodiments, the at least one processor is further configured to facilitate performing, responsive to the evaluating, at least one action defined by the at least one rule in the at least one correlation.

In accordance with one or more embodiments, the at least one processor is configured to allocate memory in a pool to the at least one correlation.

One or more embodiments provides that the at least one processor is further configured to facilitate reducing memory required for storage of the events by discarding selected information in the at least one correlation that is not of interest.

In accordance with one or more embodiments, wherein the operation includes at least one of: (A) determining whether the at least one event is of interest, responsive to the at least one event, by filtering the at least one event according to a filter corresponding to the at least one rule based on event content; (B) defining a window size according to the at least one rule for a set of events on which to perform operations, wherein the at least one rule operates on events of the plurality of events within the window; and (C) triggering at least one action to be performed according to the at least one rule, responsive to receipt of a plurality of events including the at least one event exceeding at least one pre-defined density within a pre-defined population.

Optionally, the filtering includes types of events corresponding to events expected from types of devices known to communicate with the system. Optionally, the filtering is based on tags in the at least one event.

In accordance with one or more embodiments, the at least one rule includes at least one of (a) specifying an alert responsive to detection of a pattern of events, (b) specifying conditionally related events, (c) specifying combinations of conditionally related events, and (d) specifying sequentially related events.

In accordance with various embodiments, one or more embodiments provides for receiving at least one event from at least one device in accordance with at least one device interface. Also, one or more embodiments provides for evaluating, responsive to the at least one event received pursuant to the at least one device interface, the at least one event in accordance with a plurality of rules including at least one rule, wherein the at least one rule defines an operation the system is to take to evaluate the at least one event. Also provided for is determining, responsive to the at least one event received pursuant to the at least one device interface, whether the at least one event is of interest, and if not, discarding the at least one event. Moreover, addition one or more embodiments provides for producing at least one correlation corresponding to the at least one event, for the at least one rule. Furthermore, one or more embodiments provides for performing the at least one action defined by the operation of the at least one rule in the at least one correlation. In addition, one or more embodiments provides for determining whether the at least one event is of interest, responsive to the at least one event, by filtering the at least one event based on event content in accordance with the operation of the at least one rule. Also provided for is defining a window size in accordance with the operation of the at least one rule for a set of events on which to perform operations, wherein the at least one rule operates on events of the plurality of events within the window. Moreover, one or more embodiments provides for triggering, in accordance with the operation of the at least one rule, at least one action to be performed, responsive to receipt of a plurality of events including the at least one event exceeding at least one pre-defined density within a pre-defined population.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE SEVERAL VIEWS OF THE DRAWING(S)

The above-mentioned and other advantages and features of the present invention will be better understood from the following detailed description of the invention with reference to the accompanying drawings, in which.

DETAILED DESCRIPTION

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

A computing environment includes various devices which are connected to one or more servers. Examples of a device, without being exhaustive, include a firewall, a router, an intrusion detection system, a scanner, a bridge, a router, a switch, a computer terminal, and the like, although other examples are possible as will be appreciated by one of skill in the art.

Devices can be programmed to detect and transmit an event, where the event includes data corresponding to a security event, in accordance with known techniques. Typically the data representing the security event is proprietary to a particular type of device. Currently, there is no universal standard defining events and event data/transmission format. Devices that are connected to a server can communicate in accordance with one or more of various known protocols. For example, some devices communicate in accordance with SNMP protocol, others via SYSLOG messages, some via serial communication protocol, etc. The server can receive the event transmitted by the device, and can recognize the event, as is taught in accordance with conventional techniques, and hence will not be further described herein.

In a typical computing environment, hundreds of devices can be connected to the server, and each of these devices can generate events many times per second under appropriate circumstances. Of the hundreds or thousands of events that occur in a typical computing environment per second, perhaps twenty of those events for example may correspond to a vulnerability event of high severity.

Relationships between the various events can further indicate that an event or group of events may need to be scrutinized for security management purposes. Hence, it can be desirable to correlate events and possibly circumstances surrounding events. One or more events that are received by the server can be correlated. In order to quickly respond to security events, it can be desirable to handle the events in real-time. An optional log may of course be provided, e.g., in a database, so events can later be retrieved and analyzed, such as for performing network forensics, data mining, trend analysis, etc.

Correlation can provide, among other things, a scheme for analyzing and correlating one or more security events to derive common vulnerabilities. For example, correlation can include one or more of: in-memory execution, and provision for plug-in-rules. Further details are explained below.

Figure 1:
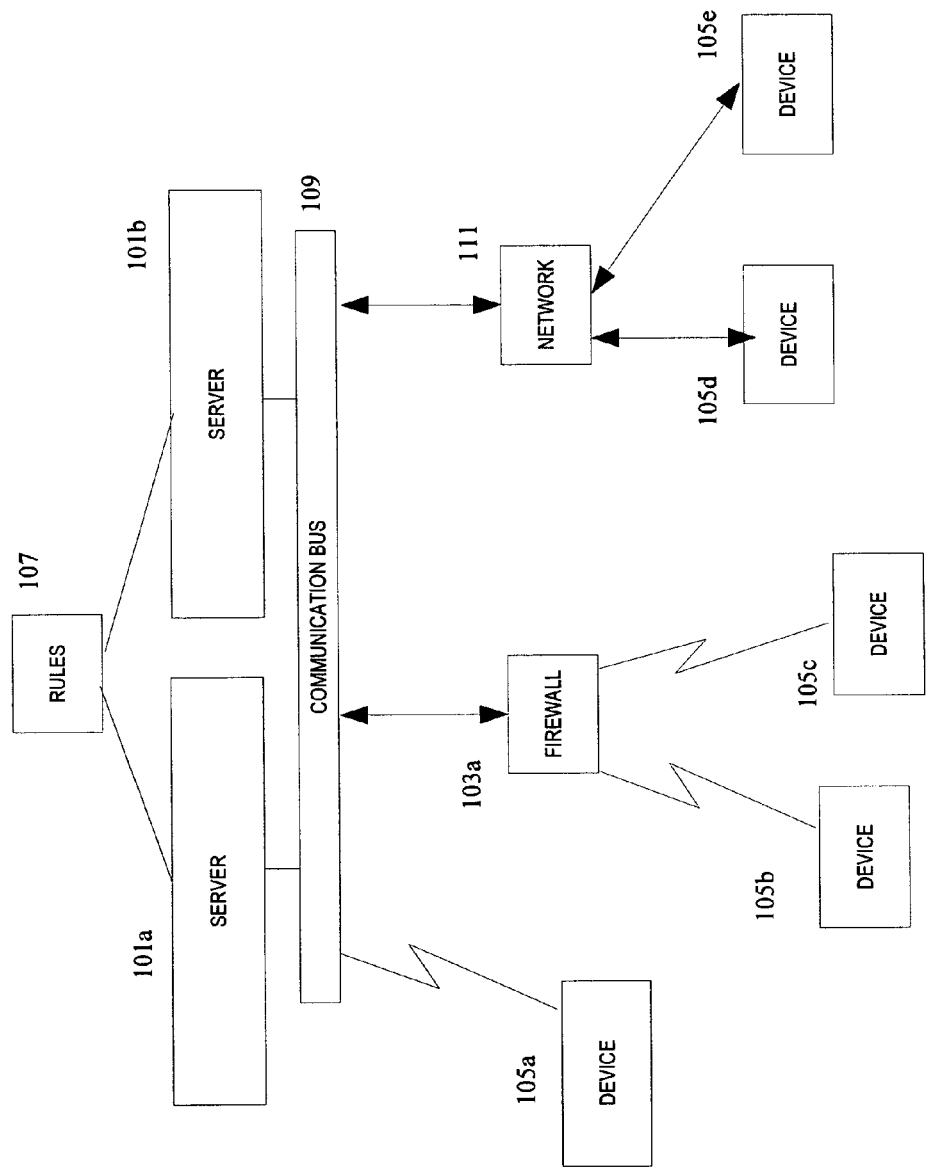
FIG. 1 is a block diagram illustrating a computing environment for use in connection with security event management, in accordance with one or more embodiments.

Reference is now made to FIG. 1, in order to provide an illustrative and simplified example computing environment with representative components thereof, together with an overall discussion of exemplary security event management. FIG. 1 is a block diagram illustrating a computing environment for use in connection with security event management, in accordance with one or more embodiments. The computing environment can include one or more servers, here represented by two servers 101*a*, 101*b* and one or more devices, here represented by five devices 105*a*, 105*b*, 105*c*, 105*d*, 105*e*. The devices 105*a*, 105*b*, 105*c*, 105*d*, 105*e* can communicate with the one or more servers 101*a*, 101*b* in a variety of ways. In the illustrated example, the devices 105*a*, 105*b*, 105*c*, 105*d*, 105*e* communicate with the servers 101*a*, 101*b* via a communication bus 109. One of the illustrated devices 105*a* transmits information, e.g., over a connection with the communication bus 109. Two of the illustrated devices 105*b*, 105*c* are connected to the communication bus 109 through a firewall 103*a*. The firewall 103*a* can communicate with the servers 101*a*, 101*b* over the communication bus 109. Two other illustrated devices 105*d*, 105*e* can communicate over a network 111 via the communication bus 109. The devices 105*a*, 105*b*, 105*c*, 105*d*, 105*e* illustrated here are representative of various numbers and types of devices that can be in communication with the servers 101*a*, 101*b*, and indeed it is expected that the devices in communication will change over time.

The system for correlating events from devices relating to security event management can advantageously include one or more servers 101*a*, 101*b*. Typically, the servers 101*a*, 101*b* include one or more device interfaces, for receiving events from one or more devices 105*a*, 105*b*, 105*c*, 105*d*, 105*e*. Device interfaces can be prepared in accordance with conventional techniques, and can receive and/or transmit communications, including receiving one or more events transmitted from the devices 105*a*, 105*b*, 105*c*, 105*d*, 105*e* according to various known techniques.

For simplification, reference will now be made to one of the servers 101*a*. Assume for the purpose of illustration that the server 101*a* has received one or more events, e.g., via its device interface. The server 101*a* can be configured to facilitate, responsive to the one or more events received pursuant to the at least one device interface, evaluating the at least one event in accordance with the rules 107. In other words, when the server 101*a* receives the event, the server 101*a* can evaluate the event in accordance with the rules 107 that are provided for security event management.

One or more embodiments of rules will be described in more detail below by way of example. A rule in the rules 107 can, for example, reference, correspond to, or define an operation the server 101*a* is to take to evaluate the event or events. In accordance with various embodiments, a rule can reference, correspond to, or include, for example, an action to be taken, and/or an operation to be used in making an evaluation of the conditions under which the action should be taken. Where the rule provides not only the action to be taken, but also an evaluation of the conditions under which the action should be taken, the server 101*a* can avoid taking action until conditions warrant the particular action.

Advantageously, and in accordance with one or more embodiments, an operation can include a condition (e.g., as described below), parameter(s) for the condition, and the operator (e.g., and, or, or ordering). One or more embodiments provide that the conditions can correlate to events, even events other than the particular event being handled. For example, the condition can include a pattern of events, one or more relations between events, and/or a density of events, as further explained below.

In accordance with exemplary embodiments, a pattern of events can be specified, for example, by a filter that is to be applied to the events under consideration. Consider, for example, a situation where only events that include particular information are desired to be included in an evaluation. A filter can specify event information, for example based on a predicate utilizing data fields normally present in the event information. Event information might include, e.g., an internet protocol ("i.p.") address, or a severity, hence a filter might specify that only events with a severity greater than "3" (high severity) and a specific source i.p. address are tracked.

As mentioned above, one or more embodiments can provide that the condition can include one or more relations between one or more events. A window can be provided, for keeping track of information relating to specified events. A window advantageously can define a scope of events that will be examined, e.g., by time, by a filter (as described above), and/or by the condition. For example, the window can define a number of most recent events, a time limit for most recent events, a particular start and stop time, etc. Events that are included in the window can be included in an evaluation, e.g., in accordance with the operation (described in more detail below). The window can track the information that is current to the scope; information that is outside the scope defined for the window can be dropped, e.g., by re-using the memory for information no longer in the scope.

One or more embodiments can provide that a condition can include the density of events. The density specifies a number of events that are detected over a period of time. When the density reaches a threshold, the action can be invoked or otherwise triggered. In other words, the density can cause the number of matches to be counted, optionally over a specified period of time, and can trigger an action if the count reaches a specified threshold. A density utilized in connection with a pattern and a relation, can specify for example that an action is to be executed after receiving 5 events (the trigger) in a 60 second time period (the window) with the same source i.p. (the pattern).

Parameters of the condition can be utilized to specify values that are understood by one or more conditions. Specifically, with regard to the foregoing example, a "trigger" can be passed values for "count", "time", and a discriminator (e.g., source i.p.).

An operation can include, in accordance with one or more embodiments, a description of types of events that are of interest, for example as a condition and/or a parameter. An operation can be specified as part of a rule, to assist in describing, e.g., events, and conditions to be evaluated. In accordance with various embodiments, an operation can include an operator; the operator can define an ordering (e.g., the result continues to evaluate through one or more next events), an intersection ("and") of two or more results, and a union ("or") of two or more results.

Conditions can be utilized to describe various and optional situations that a user may desire to be aware of. For example, a condition can include a filter can be utilized to watch for particular situations. Accordingly, one or more embodiments can provide an ability to monitor events based on watch lists.

As can be noted from the illustration of FIG. 1, multiple servers 101a, 101b can be provided. The event management can optionally be distributed among the servers 101a, 101b. For example, the events can be received by more than one server, e.g., all servers. However, the rules 107 can be distributed amongst the servers. Hence, a received event can be processed in accordance with a portion of the rules 107 in connection with the individual server having that portion of the rules 107, so that the processing of the event/rule correlations can be distributed among the servers.

The server 101a, 101b can perform one or more actions, as defined by inclusion in, correspondence to, or reference by, one or more of the rules 107 that are applied to an event. An action can include, e.g., one or more known procedures for responding to an event. Examples of actions can include, e.g., alerting an operator, taking an action to shut down an interface, launching an action script, etc. Optionally, an action can include initiating a commercially available plug-in security routine, such as a commercially available virus control routine.

The server 101a, 101b can facilitate correlating the event(s) with one or more of the rules that are to be applied to the event(s). For example, the server 101a, 101b, after receiving the event, can correlate the rules 107 to the event, and can facilitate applying the rules 107 to the event.

Accordingly, the server 101a, 101b can be configured to facilitate determining whether one or more events is of interest, responsive to the event(s), by filtering the event(s) based on a content in the event, as described in more detail herein. Further, the server 101a, 101b can facilitate defining a window size for a set of events on which to perform one or more operations, wherein the rules 107 operate on events within the window, as described in detail herein. Additionally, the server 101a, 101b can facilitate triggering one or more actions to be performed, responsive to receipt of events including the previously-mentioned event, exceeding one or more pre-defined densities within a pre-defined population of events. The pre-defined population of events can be defined by, e.g., the window, the filter, or other methods of specifying a population of events. The server 101a, 101b can perform one, a combination thereof, or all of the foregoing.

Filtering of events can be performed in a variety of ways. Events expected by a server 101a, 101b from the devices 105a-e generally includes information which is typically defined by the manufacturer of the device 105a-e and can depend on the device type. According to one or more embodiments, the types of devices that are expected to be in communication with the server 101a, 101b are known to the server. Types of devices can be ascertained in accordance with known techniques. From the types of devices, the types of events that are expected can be ascertained. The filtering that is performed by the server 101a, 101b can include types of events corresponding to events expected from types of devices known to communicate with the server 101a, 101b.

Moreover, the information fields, sometimes referred to as "tags," that can be associated with a type of device, can be known to the server 101a, 101b. For example, conventionally the manufacturer of a device 105a-e can define the particular tags, and ranges of data to be expected in the particular tags, associated with a type of device. Different types of devices can include different tags. Information regarding the tags can be stored and made available to the server 101a, 101b. Accordingly, the filtering can be based on tags in the at least one event.

Optionally, the user can interact with the server 101a, 101b in order to specify events and/or tags utilized in connection with filtering. Further optionally, the server 101a, 101b can prompt the user for events and/or tags that are applicable to devices 105a-e known to communicate with the server 101a, 101b.

As illustrated in connection with FIG. 1, the rules 107 can be stored in memory. One or more of the rules can be provided, for example, through the server 101a, 101b interacting with the user and/or by the server downloading the rules 107. The rules 107 can be created and/or modified. Optionally, the rules 107 can be provided in logical sets, as desired, e.g., for the convenience of a user.

Further optionally, one or more of the rules or sets of rules can be indicated as active or inactive, whereby one or more rules or logical sets of rules can be created prior to use and then activated, deactivated and reactivated when desired. Control of activation of various rules can be responsive to, e.g., a user, and/or the server (e.g., as an action, or during certain times).

In accordance with one or more embodiments, one or more of the rules can include one or more of the following. One or more of the rules can specify an action, e.g., an alert responsive to detection of a pattern of events; can specify conditionally related events that can be detected, e.g., in accordance with an operation; can specify combinations of conditionally related events, e.g., in accordance with an operation; and/or can specify sequentially related events, e.g., in accordance with an operation.

An alert responsive to detection of a particular condition can be specified, for example, as an action corresponding to a rule, where the rule specifies the evaluation of the event. A conditionally related event can be specified in accordance with a rule, as for example discussed previously. A combination of conditionally related events could include, for example, a series of basic rules, in combination. A series of sequentially related events can include, for example, a rule or combination of rules that can depend, e.g., on a sequence of events, utilizing embodiments discussed in more detail herein.

Figure 2:
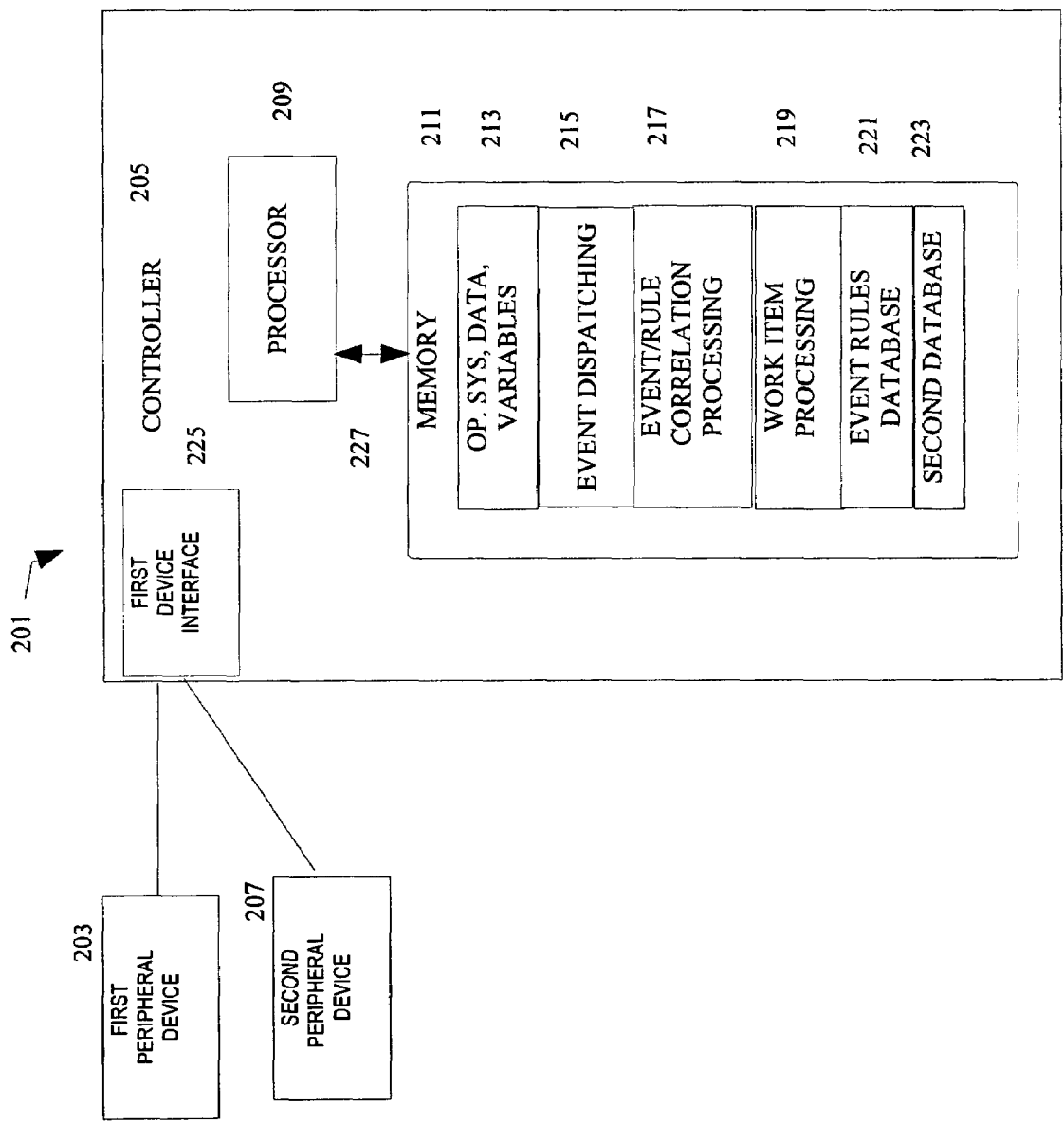
FIG. 2 is a functional block diagram illustrating portions of an exemplary server for use in connection with one or more embodiments.

FIG. 2 is a functional block diagram illustrating portions of an exemplary server 201 for use in connection with one or more embodiments. The server 201 may include one or more controllers 205, generally intercoupled as depicted. A controller 205 may include, e.g., a processor 209, a memory 211, one or more device interfaces (represented by the first device interface 225) for communication with one or more devices, and the like. A text and/or image display and/or other output device, and/or a user input device such as a keypad (all not illustrated) can be provided, and can optionally support interaction with a user.

The processor 209 may comprise one or more microprocessors and/or one or more digital signal processors. The memory 211 is coupled to the processor 209 and may comprise one or more of a read-only memory (ROM), a random-access memory (RAM), a programmable ROM (PROM), and/or an electrically erasable read-only memory (EEPROM). The memory 211 may include multiple memory locations for storing, inter alia, an operating system, data and variables 213 for overall control of execution of the processor 209; computer programs for causing the processor to operate in connection with various functions such as event dispatching 215, event/rule correlation 217, and work item processing 219, and/or other processing (not illustrated); event rules database 221 providing optional storage for the rules; and/or a second database 223 for other information, such as temporary storage utilized by windowing techniques, pools, instructions for actions to be executed and the like used by the processor 209. The computer programs stored in the memory for example, in ROM or PROM are arranged to direct the processor 209 in controlling the operation of the server 201 or controller 205.

The event dispatching 215 includes, e.g., receiving an event from a device from e.g., the first device interface 225, in accordance with known event reception techniques. Upon receiving the event, preliminary processing can be performed to prepare the event for further handling, if desired, and the event can be forwarded for further handling, if appropriate. Preliminary processing can include, by way of example, normalizing the event, filtering the event, and/or dispatching the event.

In accordance with one or more embodiments, the event can be normalized. Normalizing includes taking the raw event data as received from the device, preparing the event data into a standardized format, and outputting the event in the standardized format. Normalizing event data allows the events that are received to provide a basis for a standard utilization of event data received from a wide variety of devices.

Further, acquiring better data, e.g., through filtering of the data, in connection with receipt of the event (e.g., closer to the event source) permits processing to proceed on event data that has been deemed more valuable. Hence, optionally, the event dispatching 215 can include a filter specifying events, or content of events. One or more filters can be provided, wherein events that meet the filter requirements are dispatched (or alternatively are not dispatched upon meeting the filter requirements).

Advantageously, an event that has been preliminarily processed can be dispatched for handling, for example to a queue of events. An event in the queue of events can be dispatched for correlation with the rules. For example, a process can manage the queue to ensure that events in the queue are handled in an appropriate order, and/or can assign events to appropriate processes for further handling.

The event/rule correlation processing 217 includes, upon receipt of an event from a device, or upon getting the next dispatched event, correlating the received event with one or more rules and creating an event/rule correlation. Advantageously, the event/rule correlation includes an association of the event with, e.g., each of the active rules. Optionally, the event/rule correlation further can include with any current information as desired, e.g., a time stamp. According to one or more embodiments, an event/rule correlation can be evaluated, e.g., the event can be evaluated in accordance with the rule (described for example above) and a result of the evaluation can be included in the event/rule correlation. The event/rule correlation advantageously can be placed into a threaded pool of memory, which can serve as temporary storage until the event/rule has been handled. The event/rule correlation, when ready for further handling, can also be referred to herein as a "work item."

In accordance with one or more embodiments, an operational context can be applied to an event. The operational context provides an analyst the ability to relate one or more rules to an abstraction of location to the event. For example, organizational computing environments can have a security region or location, e.g., trusted/untrusted networks, unclassified-classified networks, extranet/corporate networks. As another example, a device as a source can be located in an operational context, a destination can reside in an operational context, and an event originator can have an operational context. Optionally, operational context can be determined during, e.g., event dispatching 215 and/or event/rule correlation processing 217, and can be included, for example, in the event/rule correlation.

The work item processing 219 includes, for example, retrieving the next work item from the pool of work items, and processing the work item in accordance with the event/rule correlation therein. The processing of the work item can include, for example, determining an evaluation of the rule as applied to the event (e.g., in accordance with an operation of the event/rule correlation information), and optionally initiating performance of the action specified in connection with the rule. In accordance with one or more embodiments, an initial evaluation of the rule was previously performed prior to processing of the work item, and an initial result was stored in connection with the event/rule correlation. According to alternative embodiments, the work item processing 219 can perform an evaluation of the rule (as discussed in more detail above). If indicated by the evaluation, the action that is specified in connection with the rule can be initiated. Initiation of a rule can include, for example, generating a process and scheduling it in the operating system, in order to perform a script, execute executable code, issue an alert, etc.

Once an event/rule correlation is evaluated, occasionally no further processing is desired. Hence, one or more embodiments can provide that such event/rule correlations are not included as a work item. Therefore, the work item processing 219 can be limited to work items that will cause some further processing to be performed.

According to one or more exemplary and alternative embodiments, the processor 209 may be programmed to interact with the user, for example as described above. The user may input information and can invoke functions accessible through the user input device (not illustrated). The user input device may comprise one or more of various known input devices, such as a keypad, a computer mouse, a touchpad, a touch screen, a trackball, and/or a keyboard. The text and/or image display (not illustrated) may present, for example, events or other information, such as information regarding rules and/or actions, to the user by way of a conventional liquid crystal display (LCD) or other visual display. A user can interfaces with the processor 209, for example via a conventional user interface such as Outlook, Windows, and/or other interfaces.

If a log of events is desired, storage (not illustrated) can be included in order to log a desired portion of event information. The log of events can be created at one or more appropriate points in processing, e.g., in connection with the event dispatching, the processing of work items, and/or other processing.

Figure 3:
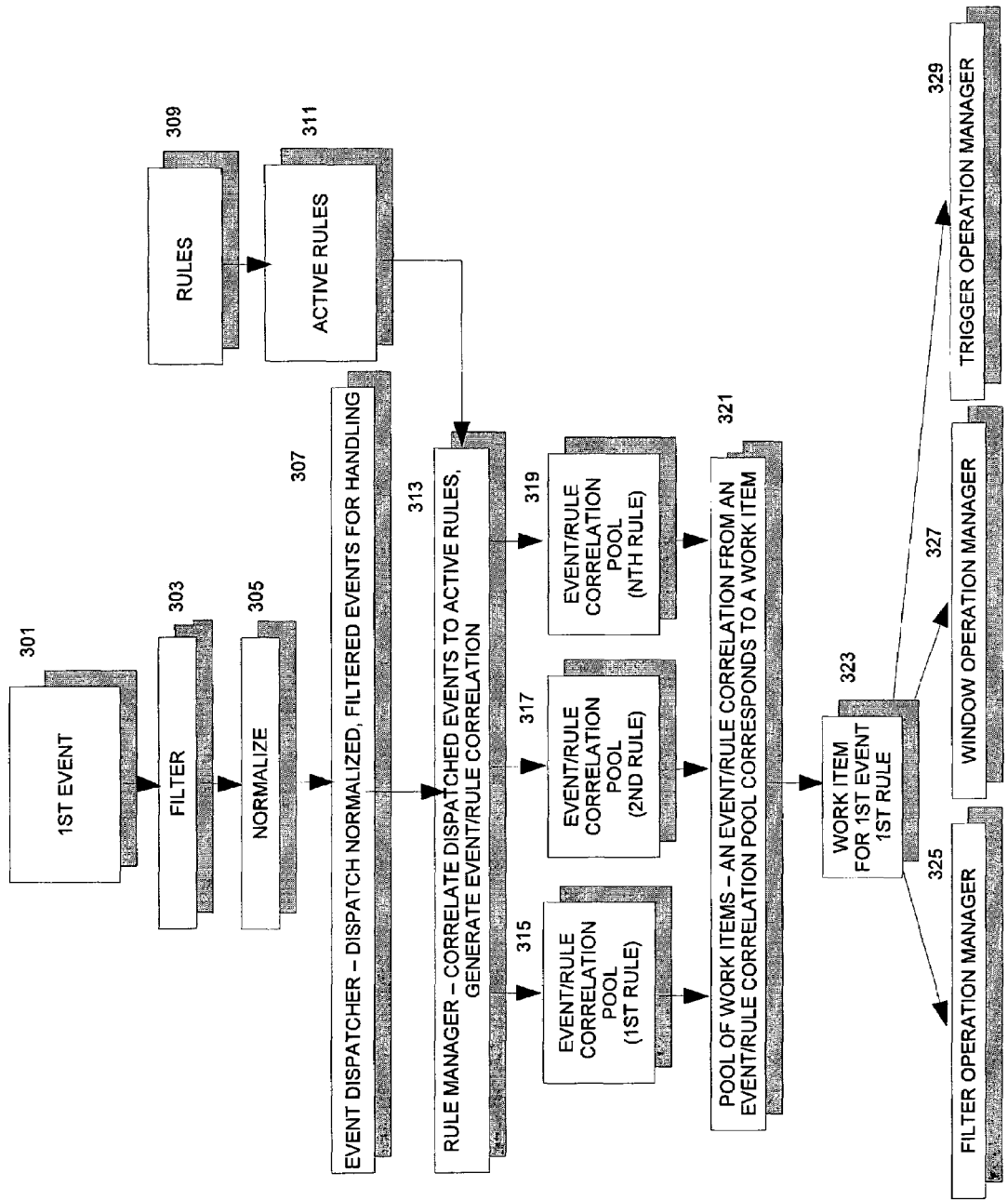
FIG. 3 is an exemplary data flow diagram illustrating a simplified and representative example architecture of a process for handling correlation of a security event in accordance with one or more embodiments.

Referring now to FIG. 3, a system and process for security event correlation will be discussed and described. FIG. 3 is an exemplary data flow diagram illustrating a simplified and representative example architecture of a process for analyzing events from devices relating to network security, e.g., handling correlation of a security event. The architecture advantageously can be implemented, for example, on a processor of a server in accordance with various exemplary and alternative exemplary embodiments. In overview, a first event 301 is received. The event is preliminarily processed, e.g., filtered 303, normalized 305, and then dispatched for further handling 307. The dispatched event can be correlated to active rules 313, e.g., to each active rule, and then each event/rule correlation placed in a pool of event/rule correlations corresponding to the rules 315, 317, 319. Further, the event/rule correlations can be placed into a pool for work items 321, for further processing. It is understood that the event/rule correlation pool and the work item pool may be logically the same. The work items are dispatched from the pool, the event in the work item is evaluated by one or more managers 325, 327, 329 according to the rule corresponding to the work item.

In order to simplify the discussion, this example considers a path of a first event 301. Naturally, this example is representative and can be applied to processing of numerous events. The more detailed explanation now follows.

One or more events are received from devices. For example, in the illustrated example, a first event 301 is received, e.g., from one or more device interfaces. The server that received the first event, or alternatively multiple servers that received the first event, can be configured to facilitate certain activity taken in response to reception of the first event 301.

The server can be configured to facilitate determining, responsive to one or more events received pursuant to the one or more device interfaces, whether the at least one event is of interest, and if not, discarding the at least one event. The first event can be preliminarily processed, including for example being filtered 303 (as described in detail above) such as to ignore pre-defined events that meet selected criteria. One event or more events can be determined to be of interest pursuant to a filter, for instance, by handling only events or events having data that match specifications in the filter.

Preliminary processing can include normalization of the first event 305, whereby the first event and information (or a relevant portion of the information) included therein can be provided in a standardized format for further processing (as described previously). Any additional preliminary processing can be provided. It will be appreciated that preliminary processing can be performed in any desired order, for example, the first event can be normalized 305 prior to being filtered 303.

After the desired amount of preliminary processing, the first event can be dispatched for further handling 307. A description of dispatching was provided above by way of example.

The dispatched event can be correlated to active rules, and can generate an event/rule correlation 313. Accordingly, responsive to reception of the first event received pursuant to the device interface, including embodiments where events are preliminarily processed, the server can correlate the first event to the rules 309. As described in more detail above, the rules can define inter alia an operation the server can take to evaluate one or more events.

Optionally, the rules that are correlated to the event can include rules that are identified as being currently active 311, while omitting rules that are not currently active. In accordance with one or more alternative embodiments, there may be provided multiple servers; the events can be received and processed by all of the multiple servers, and servers can be configured so as to share the rules amongst the servers. Accordingly, each server can process every event in accordance with only a portion of the rules, thereby distributing the processing of events amongst multiple servers.

In the illustrated exemplary architecture, a rule manager 313 can be utilized in order to correlate the first event to the active rules 311. In accordance with alternative exemplary embodiments, the server can correlate the first event with a subset of the rules that are available to be applied to events. The first event correlated with one of the active rules can be referred to herein as an event/rule correlation. The content and creation of an event/rule correlation has been discussed previously. Accordingly, the server can produce a correlation corresponding to the at least one event, for each of the rules or pre-determined portion of the rules. Advantageously, an event is correlated to each rule, although alternative embodiments can provide that an event is correlated to more than one rule.

Furthermore, when so indicated by the evaluation of the event (e.g., by an operation in the rule), the server can perform the action or actions prescribed by the event/rule correlation, e.g., as defined by the rule corresponding to the event/rule correlation. The server can perform the action, including where appropriate, for example, causing a process to be spawned to perform the action, causing performance of a pre-determined set of instructions such as a commercially provided anti-virus program, etc.

In this example, the active rules are the first rule, the second rule, and the nth rule. Hence, the rule manager 313 generates an event/rule correlation for the first event corresponding to, respectively, the first rule 315, the second rule 317, and the nth rule 319. The server can then place the event/rule correlation that corresponds to each of the active rules in a pool of event/rule correlations corresponding to the active rules. For example, the server can allocate memory, e.g., from the pool of event/rule correlations, to the particular event/rule correlation.

Further, to enable easy and timely processing, the event/rule correlations 315, 317, 319 can be placed into a pool of work items 321, where an event/rule correlation from the event/rule correlation pool corresponds to a work item. The work items can readily be obtained in order from the pool for further processing. The work items can be dispatched from the pool, the event in the work item is processed by one or more managers 325, 327, 329 according to the rule in the work item.

In the illustrated example, a filter operation manager 325 can determine whether the one or more events is of interest, responsive to the at least one event, by filtering the one or more events based on event content, as previously described for example.

Also in the illustrated example, a window operation manager 327 can define a window size for a set of events on which to perform operations, wherein the rules (or the active rules) operate on events within the window. Windowing has previously been described herein in detail.

Further illustrated is a trigger operation manager 329, which can trigger one or more actions to be performed, responsive to receipt of events including, e.g., the first event, that exceed one or more pre-defined densities within a pre-defined population, e.g., within the window. Triggering has previously been described herein in detail.

The server can facilitate reducing memory required for storage of the events by discarding selected information, such as information in one or more event/rule correlations that is not of interest. Advantageously, information that is stored in the event/rule correlation is minimized. For example, not all information included in the data in the event is particularly useful. Optionally, various types of information that are not useful can be eliminated at one or more points during the processing of events. For example, information can be omitted when events are normalized 305, when events are correlated 313 and it can be determined that various information will not be further utilized, when events are included in the pool of work items 321, and/or when work items are processed by one or more of the filter operation manager, window operation manager, and/or trigger operation manager 325, 327, 329. Moreover, because the events are handled in real time, storage of event information for further handling of events can be unnecessary, with the exception of installations that may which to log information for, e.g., forensic analysis. According to one or more embodiments, therefore, memory in the event/rule correlation pool and/or in the work item pool can be minimal.

Figure 5:
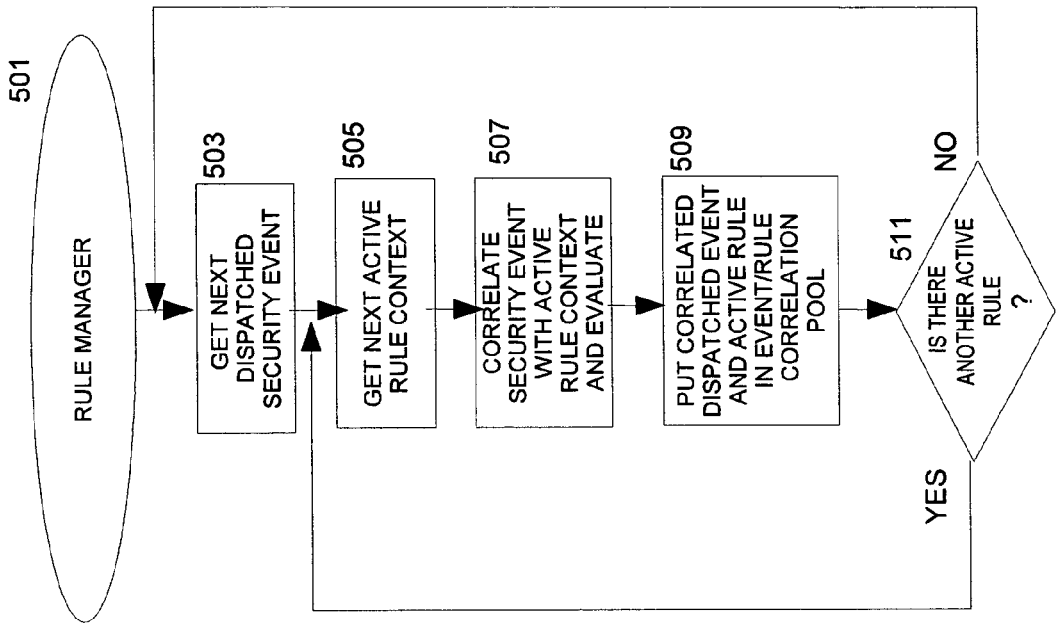
FIG. 5 is a flow chart illustrating an example procedure for managing rules in connection with security events, in accordance with one or more embodiments.
Figure 4:
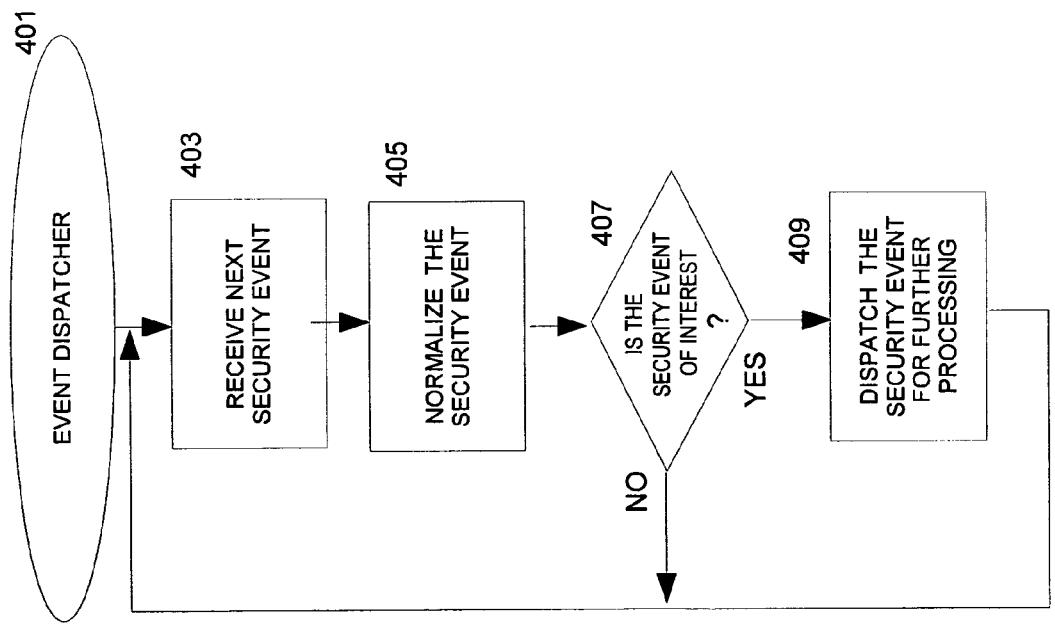
FIG. 4 is a flow chart illustrating an example procedure for dispatching a security event, in accordance with one or more embodiments.
Figure 6:
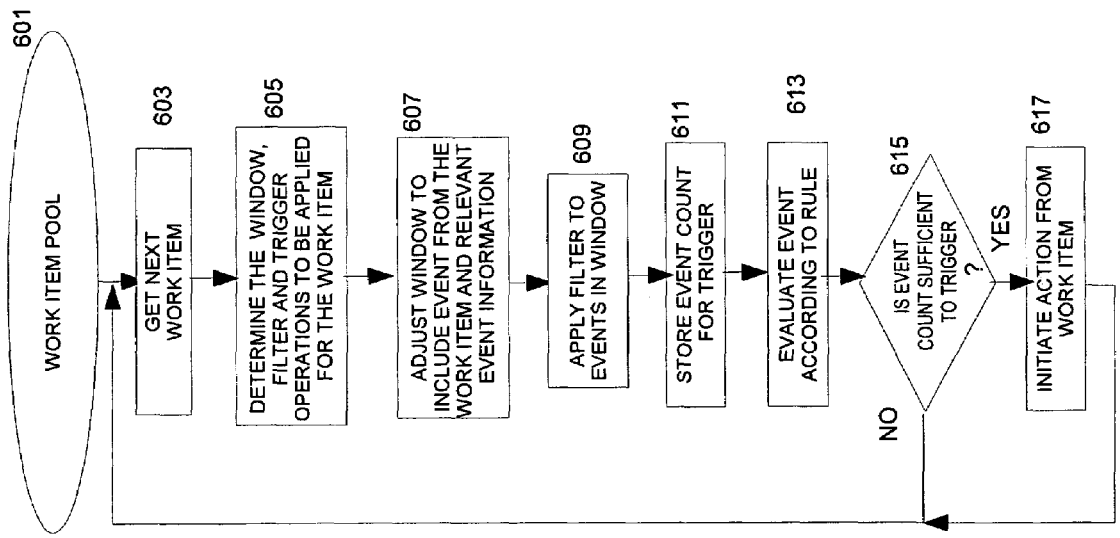
FIG. 6 is a flow chart illustrating an example procedure for processing a pool of work items, in accordance with one or more embodiments.

FIGS. 4-6 provide flow charts illustrating procedures that can be utilized in connection with various processes that can be useful in connection with providing an implementation of one or more embodiments. In the illustrated example, there are provided procedures for dispatching events (FIG. 4), managing the application of rules to events (FIG. 5), and processing a pool of work items (FIG. 6), where a work item includes a correlated event and rule.

Now referring to FIG. 4 in more detail, FIG. 4 is a flow chart illustrating an example procedure for dispatching a security event, in accordance with one or more embodiments. Advantageously, the procedure can be implemented on a processor, for example such as the processor illustrated in connection with FIG. 2. Dispatching event 401 can begin with receiving a security event 403. Security events and reception thereof have been previously discussed.

The event, having been received, is normalized 405, as for example previously discussed in detail. If it is determined 407 that the security event is of interest, for example, utilizing filters as detailed herein, then the security event can be dispatched 409 for further processing in accordance with the illustrated exemplary embodiments herein. If the security event is not of interest, then this exemplary embodiment provides that the security event is not dispatched, thereby being, in effect, ignored.

Dispatching an event can include, for example, placing the event into a queue or pool, and waking a process (or processes) to handle events in the queue or pool. In the current example, the process handling events in the queue include the rule manager, discussed for example in connection with FIG. 5 (below).

Once the event dispatcher 401 has handled the preliminary processing (e.g., normalizing, filtering) and has (or has not) dispatched the received event, it loops to receive the next security event 403 and repeats processing for the next security event.

Now referring to FIG. 5 in more detail, FIG. 5 is a flow chart illustrating an example procedure for managing rules in connection with security events, in accordance with one or more embodiments. Advantageously, the procedure can be implemented on a processor, for example such as the processor illustrated in connection with FIG. 2.

The rule manager 501 can provide a process for handling events that have been, optionally, normalized and/or filtered. A convenient method for obtaining events in an ordered fashion to be handled by the rule manager 501 includes providing the events from a queue or pool, e.g., a threaded pool. General techniques for implementing queues and pools are known in the art, and can be applied utilizing the principles and/or in accordance with the examples provided herein. Accordingly, the rule manager 501 gets the next dispatched security event, e.g., from a pool of events. Each event that has been received is correlated with each rule, or, if appropriate, with a portion of the rules, e.g., with each active rule. Where, for example, there are twenty active rules, each received event handled by the rule manager 501 will be correlated with twenty active rules, thereby generating twenty event/rule correlations. As illustrated, for the dispatched security event, the next active rule 505 is obtained, and the event can be correlated 507 with the active rule and optionally can be evaluated according to the active rule. The correlated dispatched event and the active rule can be placed 509 into a pool, e.g., the event/rule correlation pool. The event/rule correlation pool can provide a convenient means of grouping event/rule correlations in proper order for later handling, e.g., by processes accessing the work item pool. If there is another active rule 511 that has not been correlated to the event, the foregoing 505, 507, 509 can be repeated. Once each rule (or active rule) has been correlated to the event, the rule manager 501 can proceed to get the next dispatched security event 503 and to correlate the next dispatched security event to the rules. The rule manager 501 can continue to loop to handle dispatched security events.

Now referring to FIG. 6 in more detail, FIG. 6 is a flow chart illustrating an example procedure for processing a pool of work items 601, in accordance with one or more embodiments. Advantageously, the procedure can be implemented on a processor, for example such as the processor illustrated in connection with FIG. 2.

In the illustrated example, one or more processes can be provided for handling work items in the work item pool. As discussed in more detail above, a work item can include event information, a correlated rule, and/or other optional information such as the evaluation of the event in accordance with the rule; also as discussed above in more detail, a rule can include a condition expressed, for example, as a pattern, a relation, and/or a density. A convenient method for providing events in an ordered fashion includes providing the events from a queue or pool, e.g., a threaded pool. Accordingly, the next work item 603 is obtained, e.g., from the pool of work items. From the work item, the window, filter, and trigger operations are determined 605, which are to be applied to the work item.

The work item, e.g., the event and the rule, can then be processed. In the illustrated example, the window can be adjusted 607 in accordance with the rule to include the event from the work item and other relevant event information, e.g., as stored in the work item pool. Additionally, the filter, if specified in the rule of the work item, can be applied 609 to the events in the window. The event can then be evaluated 613 according to the rule. Where a trigger is specified in the rule, the event count can be incremented and stored 611 for the trigger.

If the event count 615 was sufficient to exceed a threshold specified for the trigger, the action associated with the work item 617 can be initiated. Actions have been discussed previously and include, for example, standard anti-virus applications, display processing, and/or alert processing. An action can be initiated, for example, by initiating or invoking an appropriate process, as discussed above.

In any event, the process provides for getting the next work item 603 and continuing to repeat the above process, for each work item.

Figure 7:
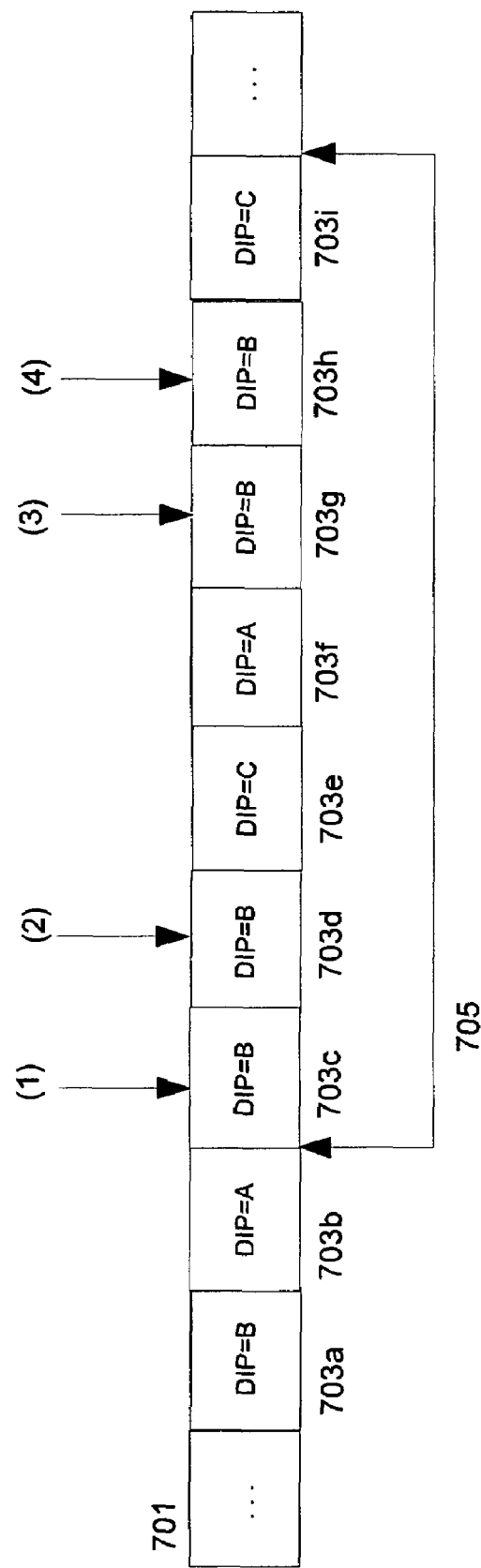
FIG. 7 is a timing diagram illustrating a window for processing of security events, in accordance with one or more embodiments.

Reference is now made to FIG. 7, providing a representation for illustration purposes of a series of received events. FIG. 7 is a timing diagram illustrating a window for processing of security events, in accordance with one or more embodiments. The series 701 of events 703a-703i is received, e.g., by a server such as illustrated in connection with FIG. 1. (In operation, generally, events are not necessarily received in a precisely timed order.) This example considers one part of the information included in the event, for illustration purposes, which is the destination i.p. address ("DIP"). In the example, the DIP is "A" for events 703b, and 703f; the DIP is "B" for events 703a, 703c, 703d, 703g, and 703h; and the DIP is "C" for events 703e and 703i. The window 705 in the illustrated example is set to a size of seven events. If, for example, the filter specifies a DIP of "B", then the evaluation within the window will reveal that there are four occurrences (1)-(4) of a DIP of B. Events which are outside the window are disregarded.

In accordance with the above embodiments and alternative exemplary embodiments, there have been discussed and described various examples of providing an effective means of managing, optionally in real time, security events that occur in a computing environment. The above examples provide that the events are evaluated as received, in an orderly manner. Events can be evaluated in context, e.g., by including a condition of other events. Storage of events can be minimized, e.g., by including information utilized in processing the events, in pools. These and other features have been discussed and described above by way of examples.

It should be understood that the invention is described in connection with logical groupings of functions or resources. One or more of these logical groupings may be omitted from one or more embodiments, and still remain within the scope of the present invention. Likewise, functions may be grouped differently, combined, or augmented without parting from the scope of the invention. Similarly the present description may describe various databases or collections of data and information. One or more groupings of the data or information may be omitted, distributed, combined, or augmented, or provided locally and/or remotely without departing from the scope of the invention.

Figure 8:
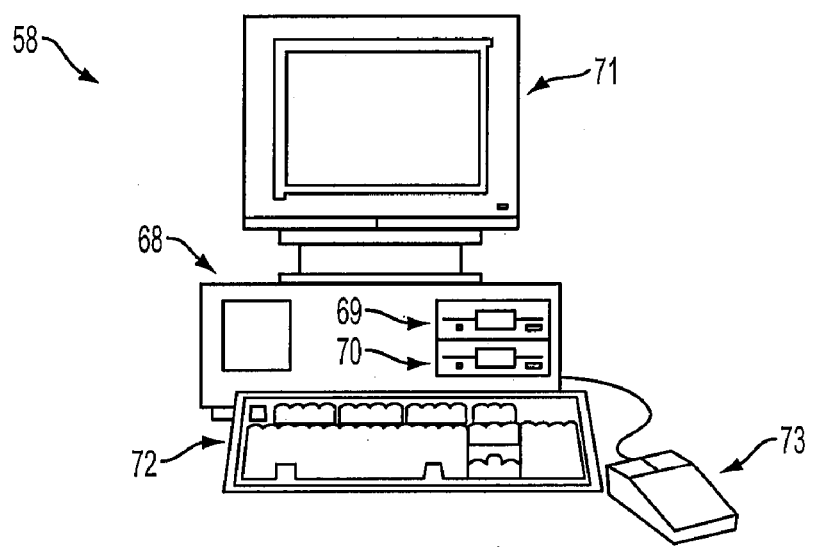
FIG. 8 shows a block diagram of a computer used for implementing one or more embodiments of the present invention, in accordance with a computer implemented embodiment.

Advantageously, one or more embodiments can be implemented on one or more computers. FIG. 8 is an illustration of a computer 58 used for implementing the computer processing in accordance with a computer-implemented embodiment of the present invention. The procedures described herein may be presented in terms of program procedures executed on, for example, a computer or network of computers.

Viewed externally in FIG. 8, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 10:
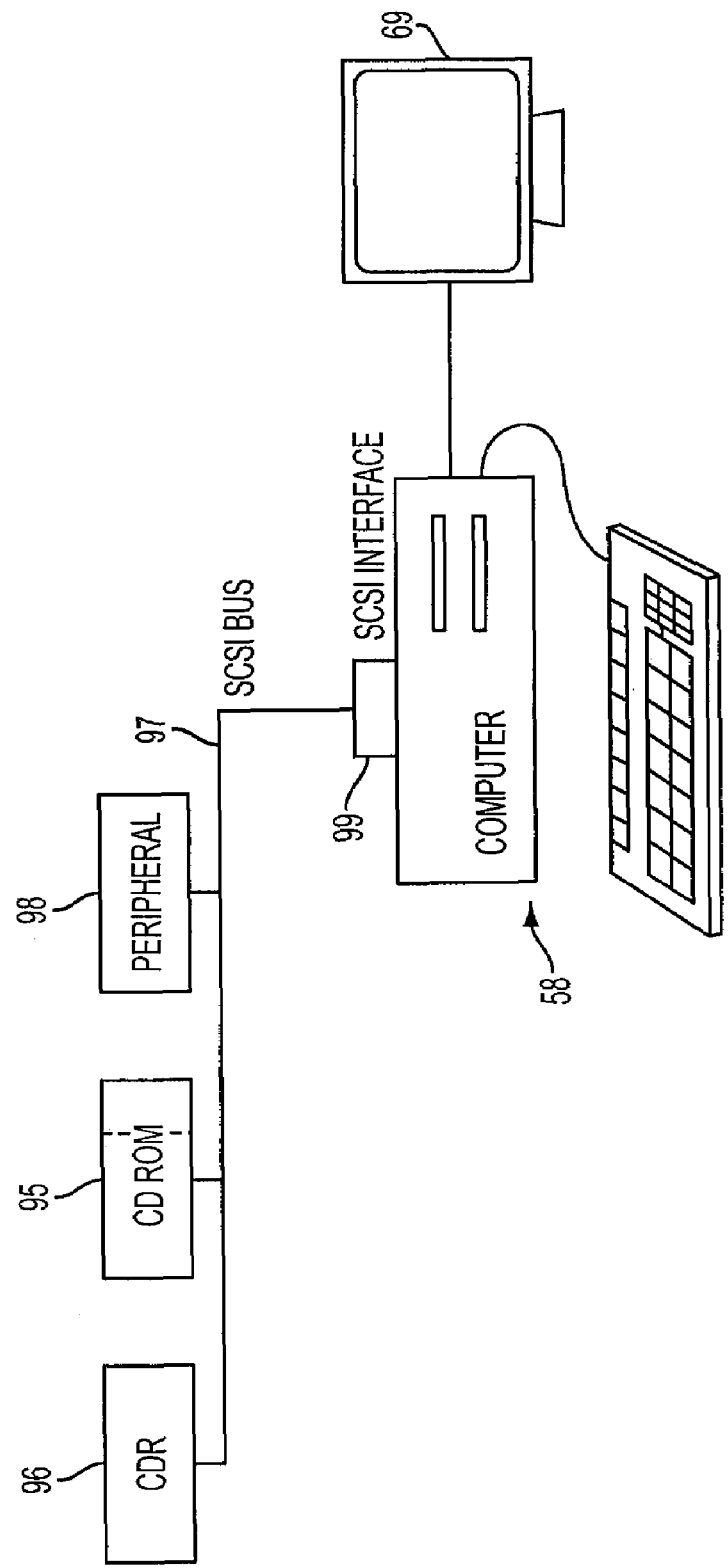
FIG. 10 illustrates a block diagram of an alternative computer of a type suitable for carrying out the present invention.

Alternatively, referring to FIG. 10, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to the computer 58.

Figure 9:
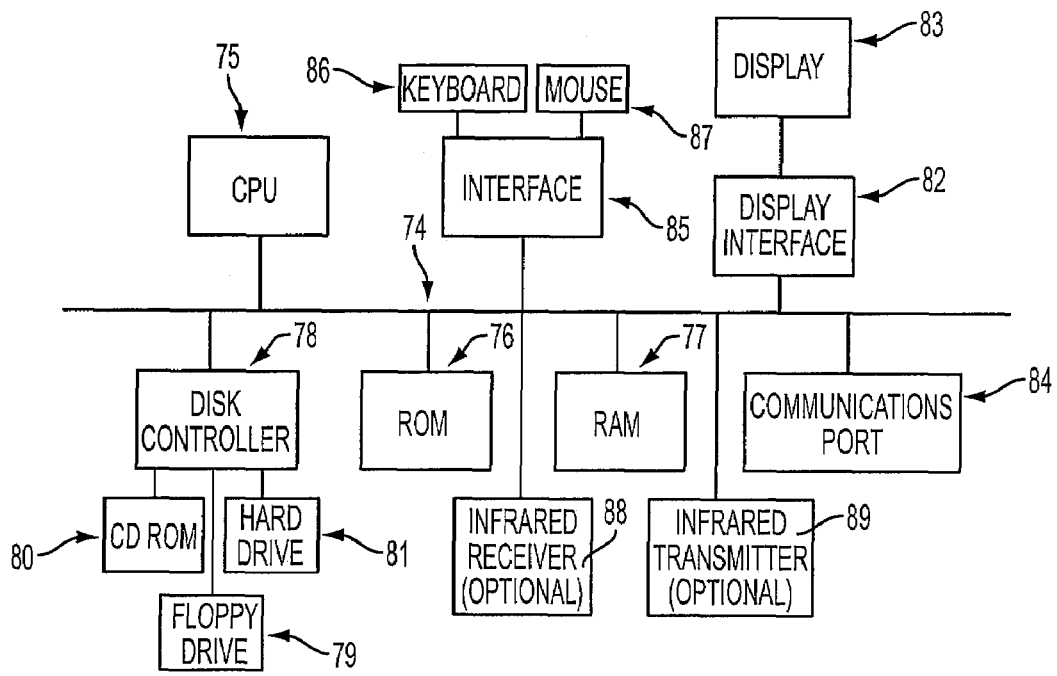
FIG. 9 illustrates a block diagram of the internal hardware of the computer of FIG. 8.

FIG. 9 illustrates a step diagram of the internal hardware of the computer of FIG. 15. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

The system according to the invention may include a general purpose computer, or a specially programmed special purpose computer. The user may interact with the system via e.g., a personal computer or over PDA, e.g., the Internet, an intranet, etc. Either of these may be implemented as a distributed computer system rather than a single computer. Similarly, one or more communications links may be a dedicated link, a modem over a POTS line, and/or any other method of communicating between computers and/or users. Moreover, the processing could be controlled by a software program on one or more computer systems or processors, or could even be partially or wholly implemented in hardware. The system used in connection with the invention may rely on the integration of various components including, as appropriate and/or if desired, hardware and software servers, database engines, and/or other content providers.

Although the computer system in FIGS. 8-10 is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

User interfaces may be developed in connection with an HTML display format. It is possible to utilize alternative technology for displaying information, obtaining user instructions and for providing user interfaces.

The invention may include a process and/or steps. Where steps are indicated, they may be performed in any order, unless expressly and necessarily limited to a particular order. Steps that are not so limited may be performed in any order.

What is claimed is:

1. A method for analyzing network security events, the method comprising:
    filtering a series of events into one or more sets of events based on one or more filtering criteria;
    associating each of the one or more sets of events with one or more active rules that are selected from a plurality of rules, each of the plurality of rules defining one or more actions to be performed when one or more events cause the rule to be triggered;
    evaluating each of the filtered events in at least one of the sets of events in accordance with the one or more active rules associated with the at least one set of events, wherein a result of the evaluation includes one or more work items, and wherein each of the work items includes at least one of the filtered events in the at least one set of events and at least one of the one or more active rules associated with the at least one set of events;
    dynamically allocating the one or more work items to one or more respective threads in a thread pool; and
    processing each of the allocated work items in accordance with the at least one active rule in the respective work items to determine whether to initiate the one or more actions defined in the at least one active rule.

2. The method of claim 1, wherein each of the events in the series of events include one or more tags, and the filtering further comprising:
    filtering the series of events into the one or more sets of events based on the tags.

3. The method of claim 2, wherein processing each of the work items includes determining whether the filtered events in the work item satisfy at least one condition defined in the at least one active rule associated with the work item, the at least one condition including one or more of a pattern of events, a relation between events, or a density of events.

4. The method of claim 1, further comprising:
    applying an operational context to the series of events, wherein the operational context relates one or more of the plurality of rules to an abstracted location of a respective event in the series of events.

5. The method of claim 2, wherein the tags define a type of device that transmitted the event.

6. The method of claim 2, wherein filtering the series of events further comprises:
    discarding one or more of the events in the series of events that are determined to not be of interest.

7. The method of claim 1, wherein the one or more active rules are selected for activation in response to a user selection.

8. The method of claim 1, wherein the one or more active rules are selected for activation by a server during predetermined times.

9. The method of claim 1, further comprising:
    distributing the plurality of rules amongst a plurality of servers, wherein each of the plurality of servers process each of the filtered events in the at least one set of events in accordance with a portion of the plurality of rules that have been distributed to the particular server.

10. The method of claim 1, further comprising discarding selected information in at least one of the work items that is not of interest, wherein discarding the selected information reduces an amount of memory required to store the filtered events in the at least one work item.

11. The method of claim 1, wherein the actions defined in each of the plurality of rules include one or more of a filter operation, a window operation, or a trigger operation.

12. The method of claim 1, wherein the actions defined in each of the one or more active rules include at least one of generating an alert or initiating an anti-virus program.

13. A system for analyzing network security events, the system comprising:
    a plurality of network devices configured to transmit a series of events;
    a server configured to:
        filter the series of events into one or more sets of events based on one or more filtering criteria;
        associate each of the one or more sets of events with one or more active rules that are selected from a plurality of rules, each of the plurality of rules defining one or more actions to be performed when one or more events cause the rule to be triggered;
        evaluate each of the filtered events in at least one of the sets of events in accordance with the one or more active rules associated with the at least one set of events, wherein a result of the evaluation includes one or more work items, and wherein each of the work items includes at least one of the filtered events in the at least one set of events and at least one of the one or more active rules associated with the at least one set of events;
        dynamically allocate the one or more work items to respective one or more threads in a thread pool; and
        process each of the allocated work items in accordance with the at least one active rule in the respective work items to determine whether to initiate the one or more actions defined in the at least one active rule.

14. The system of claim 13, wherein each of the events in the series of events include one or more tags, and the server further configured to:
    filter the series of events into the one or more sets of events based on the tags.

15. The system of claim 14, wherein processing each of the work items comprises the server further configured to:
    determine whether the filtered events in the work item satisfy at least one condition defined in the at least one active rule associated with the work item, the at least one condition including one or more of a pattern of events, a relation between events, or a density of events.

16. The system of claim 13, wherein the server is further configured to:
    apply an operational context to the series of events, wherein the operational context relates one or more of the plurality of rules to an abstracted location of a respective event in the series of events.

17. The system of claim 14, wherein the tags define a type of device that transmitted the event.

18. The system of claim 14, wherein filtering the series of events comprises the server further configured to:

discard one or more of the events in the series of events that are determined to not be of interest.

19. The system of claim 13, wherein the one or more active rules are selected for activation in response to a user selection.

20. The system of claim 13, wherein the one or more active rules are selected for activation by the server during predetermined times.

21. The system of claim 13, wherein the server is further configured to:

discard selected information in at least one of the work items that is not of interest, wherein discarding the selected information reduces an amount of memory required to store the filtered events in the at least one work item.

22. The system of claim 13, wherein the actions defined in each of the plurality of rules include one or more of: a filter operation, a window operation, or a trigger operation.

23. The system of claim 13, wherein the actions defined in each of the one or more active rules include at least one of generating an alert or initiating an anti-virus program.

24. A computer readable storage medium comprising computer readable instructions operable when executed by a computer to analyze network security events, the computer readable instructions configured to:

filter a series of events into one or more sets of events based on one or more filtering criteria;

associate each of the one or more sets of events with one or more active rules that are selected from a plurality of rules, each of the plurality of rules defining one or more actions to be performed when one or more events cause the rule to be triggered;

evaluate each of the filtered events in at least one of the sets of events in accordance with the one or more active rules associated with the at least one set of events, wherein a result of the evaluation includes one or more work items, and wherein each of the work items includes at least one of the filtered events in the at least one set of events and at least one of the one or more active rules associated with the at least one set of events;

dynamically allocate the one or more work items to respective one or more threads in a thread pool; and process each of the allocated work items in accordance with the at least one active rule in the respective work items to determine whether to initiate the one or more actions defined in the at least one active rule.

* * * * *